United States Patent [19]
Dogliotti et al.

[11] 4,121,165
[45] Oct. 17, 1978

[54] DIGITAL DEMODULATOR WITH INTERPOLATION FOR LINEARLY AMPLITUDE-MODULATED DATA SIGNALS

[75] Inventors: Renato Dogliotti; Umberto Mazzei, both of Turin; Umberto Mengali, Pisa, all of Italy

[73] Assignee: CSELT - Centro Studi e Laboratori Telecomunicazioni S.p.A., Turin, Italy

[21] Appl. No.: 790,081

[22] Filed: Apr. 22, 1977

[30] Foreign Application Priority Data

Apr. 22, 1976 [IT] Italy ................................. 67962 A/76

[51] Int. Cl.² .......................... H03D 1/02; H03K 9/02
[52] U.S. Cl. ..................................... 329/50; 329/104; 329/109; 329/145
[58] Field of Search ................ 329/50, 104, 105, 109, 329/145

[56] References Cited
U.S. PATENT DOCUMENTS 4,035,735   7/1977   Akashi et al. ........................... 329/50

Primary Examiner—Siegfried H. Grimm
Attorney, Agent, or Firm—Karl F. Ross

[57] ABSTRACT

A digital demodulator of data signals transmitted by linear amplitude modulation of a carrier, sampled under the control of clock pulses CK1, comprises an interpolating unit UIN including a tapped delay line TDL whose outputs carry, at a given instant, respective signal samples received during different clock cycles. These signal samples are fed to a transversal filter FIN also receiving two sets of interpolation coefficients $a_k$, $b_k$ read out from respective memory sections ME1, ME2. The signal samples from the several delay-line taps are multiplied in filter FIN by the two sets of coefficients $a_k$ and $b_k$, under the control of a pulse train CK2 and another pulse train CK3 of the same cadence but phase-shifted with reference to the former, and the two sets of resulting products are respectively summed in a digital adder SM and alternately read out to a phase corrector CJ recovering the phase coherence of the demodulated baseband signal.

5 Claims, 5 Drawing Figures

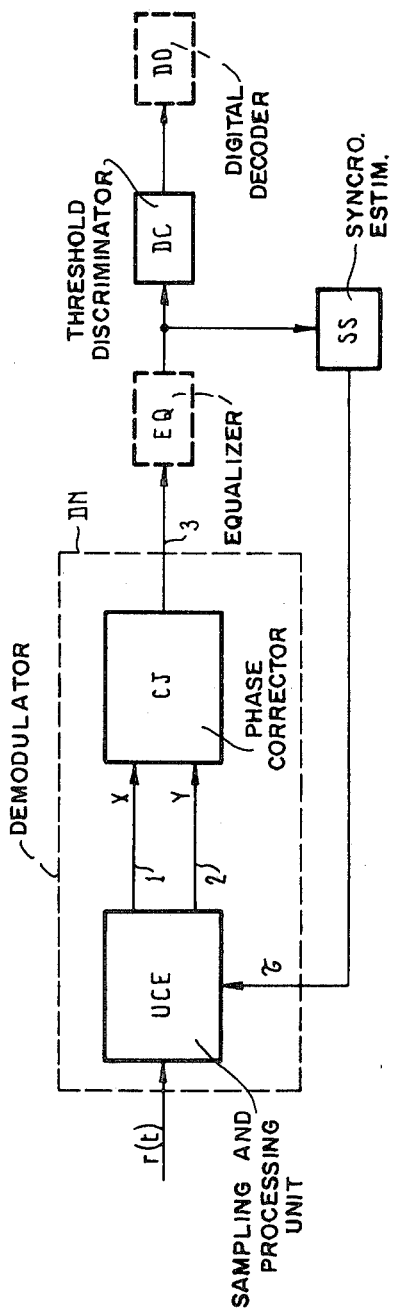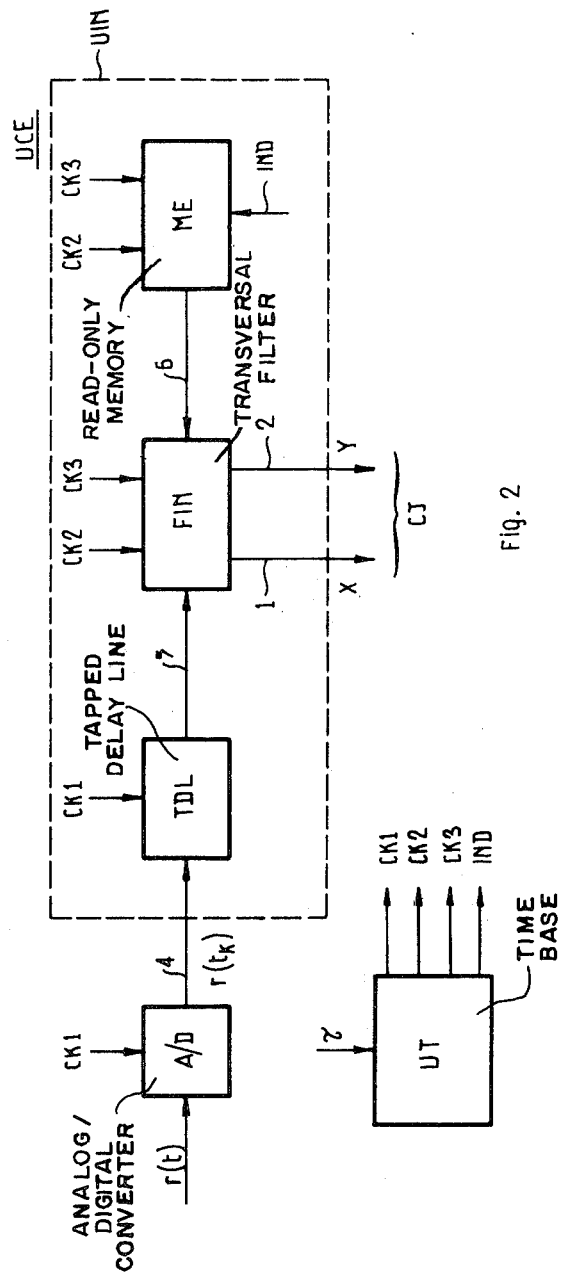
Fig. 1
Fig. 2

DIGITAL DEMODULATOR WITH INTERPOLATION FOR LINEARLY AMPLITUDE-MODULATED DATA SIGNALS

FIELD OF THE INVENTION

Our present invention relates to systems for digital transmission of signals and more particularly to a digital demodulator for data signals of a given symbol frequency $f_s$ transmitted by linear amplitude modulation of a carrier.

BACKGROUND OF THE INVENTION

As known, the information associated with a data signal, having a bandwidth W located in a frequency band bounded by lower and upper limits $f_c$ and $f_c + W$, can be completely obtained in baseband from samples of that signal extracted by means of an in-band sampling operation carried out at a suitable frequency $f_s$ satisfying the sampling theorem, i.e. $f_s \geq 2W$.

Such an in-band sampling operation is necessary to realize a demodulator having a completely digital structure, yet it gives rise to a lot of problems which are not easily solved.

First, the sampling frequency, besides being compatible with the sampling theorem, must take into account the characteristics of the transmission system where the demodulator is to be inserted (more particularly, the band of the transmitted signal and the location thereof); it must satisfy at the same time the requirements relative to the signal demodulation, and particularly relative to the coherent demodulation and to the bit synchronization; moreover, it must be able to avoid aliasing phenomena, i.e. the phenomena of overlapping of repetitive spectra of the signal, which are characteristic of the sampling itself.

A second problem is due to the fact that in-band sampling on the one hand must be carried out in instants suitable to the recovery of the information (bit synchronization) and on the other hand must yield a true signal demodulation. Thus, an interaction may occur between possible demodulation-coherence errors and bit-synchronization errors, which could considerably degrade the performance of the system and must therefore be avoided as far as possible.

Moreover, the sampling must be carried out in such a way as not to suffer from possible frequency shifts of the band of the transmitted signal (frequency offset).

A further problem arises when the demodulation must be of coherent type. In this case, in fact, it becomes necessary to correct the phase jitter of the baseband signal; to obtain this, as known, it is necessary to supply to the phase corrector not only the bandband signal but also a linear conversion thereof.

To solve these problems, two theoretical solutions are known in the technical literature; they differ from one another on the limitations imposed upon the sampling rate as well as in regard to the sampling mode utilized.

According to the first solution, either the ratio $f_s/f_c$ between sampling rate $f_s$ and the minimum transmitted frequency $f_c$ (in the case of $f_s \geq f_c$) or the inverted ratio $f_c/f_s$ (if $f_s \leq f_c$) must be an integer, in particular 1. A solution of this kind could directly provide the baseband samples of the received signal, as it is easy to demonstrate, and could be implemented by a simple sampler; but such a procedure presents serious disadvantages.

Above all, aliasing can be avoided only if the modulated signal has a very narrow bandwidth, and by using an ideal filter in order to separate repetitive spectra; as, in the practice, these two conditions and especially the latter one cannot be satisfied, a certain residual superposition or aliasing effect will always be present in the demodulated signal and will give rise to distortions of the signal itself.

Moreover, it is evident that, as the same device (i.e. the sampler) must perform the demodulating operations and ensure the bit timing, in the event that the transmission channel varies with time, demodulating and timing operations ought to be made adaptive; this can easily produce interactions degrading the operation of the system.

Furthermore, in the event that there is a frequency offset of the band of the transmitted signal, the minimum frequency $f_c$ is no longer exactly known, and so the sampling rate $f_s$ no longer satisfies the condition necessary for the direct demodulation of a baseband signal.

The latter disadvantage, at least in the case where the sampling rate is higher than the minimum transmitted frequency, could be made less significant by choosing a high value for the ratio between the two aforementioned frequencies. In that instance, however, further problems arise from the necessity of using high-velocity equipment difficult to realize, or are associated with the identification of the samples carrying useful information.

In the particular case where the minimum transmitted frequency is an integral multiple of the bandwidth of the modulated signal (which is convenient from the constructional point of view when the transmitter is of digital type), the sampling rate is subject to further restrictions which very often are incompatible with the structural requirements of the transmission system depending on the particular requirements of use.

According to a second way of maintaining the digital structure of the demodulator, the ratio between the sampling rate and the minimum transmitted frequency must be different from an integer.

This procedure always allows to keep the information contents associated with the transmitted signal and make it possible, thanks to the more flexible relationship between the two frequencies, to overcome frequency-offset and aliasing effects with greater flexibility.

More particularly, by a suitable choice of the values of ratio $f_s/f_c$, there is no need for using an ideal filter for separating adjacent spectra.

This system, however, yields only partly demodulated signal samples which, besides, appear at the downstream components of the receiver with a timing rate different from the bit rate.

If the only partial demodulation can be completed through a suitable phase corrector, always necessary in baseband to obtain a perfectly coherent demodulation, the presence of samples arriving one after the other at a timing rate different from the bit rate makes it necessary to insert, past the sampler, devices able to emit samples recurring again at the bit rate; but such devices have not yet been satisfactorily realized by the conventional techniques.

The above-mentioned difficulties, relative to the practical realization of the demodulation by in-band sampling, have caused the art to tend toward the sampling of already analogically demodulated signals.

This solution presents the disadvantage of leading to receivers in which both digital and analog components are present. This causes problems of integration between the two kinds of components which can be solved only by using suitable interfaces, making the whole device complex and thus not very reliable as well as limitedly flexible on its performance.

Moreover, a hybrid (i.e. analog-digital) system is unable to provide the linear conversion of the baseband signal necessary for the operation of the phase corrector. This makes it necessary to equip the receiving set with an auxiliary device, able to carry out such linear conversion, which presents serious design difficulties.

OBJECT OF THE INVENTION

The object of our invention is to overcome the aforestated drawbacks in a demodulator which is all digital and able to carry out the sampling of the received signal and a subsequent processing thereof, so as to emit the baseband samples, at the rate necessary for the operation of the other devices of the receiver, and to perform a linear conversion of these samples for subsequent utilization in a phase corrector, and which, besides, by acting on the processing device instead of on the sample, enables the correct timing of the recovery of the signal independently of the frequency offset of the received signal and of the sampler timing.

SUMMARY OF THE INVENTION

We realize this object, in accordance with our present invention, by providing a source of first, second and third clock pulses CK1, CK2, CK3, the first clock pulses CK1 having a cadence which is higher than the symbol frequency $f_s$ of the data signals to be demodulated but not harmonically related thereto whereas the second and third clock pulses CK2 and CK3, which are relatively staggered by half a cycle, have a cadence equaling that frequency $f_s$. Clock pulses CK1 control an analog/digital converter deriving a series of digitized samples from an incoming modulated carrier and working into a delay line controlled by the same clock pulses to present a multiplicity of successively received digitized samples on respective outputs extending from as many taps on that line. A first and a second section of a read-only memory respectively store first and second sets of interpolation coefficients $a_k$ and $b_k$ which are functions of the carrier frequency and which can be read out from these memory sections in response to address signals IND, a generator of these address signals being controlled by the clock pulses CK1 and CK2; the readout of interpolation coefficients $a_k$ occurs in the presence of clock pulses CK2 applied to an enabling input of the first memory section whereas the interpolation coefficients $b_k$ are read out, in alternating relationship with coefficients $a_k$, in the presence of clock pulses CK3 applied to an enabling input of the secondary memory section. Coefficients $a_k$ and $b_k$ are fed to first and second inputs of a digital filter also having other inputs connected to the delay-line outputs for deriving from the digitized samples and from the two sets of interpolation coefficients two interleaved trains of in-phase and quadrature samples from which a phase corrector connected to the digital filter recovers a phase-coherent baseband signal. A synchronization estimator downstream of the phase corrector feeds back an error signal $\tau$ to the source of clock pulses for establishing an optimum relative time position of the several pulse trains CK1, CK2 and CK3.

BRIEF DESCRIPTION OF THE DRAWING

The above and other features of our invention will now be described in detail with reference to the accompanying drawing in which:

FIG. 1 is a block diagram showing the insertion of a demodulator according to our invention in the network of a digital receiver for linearly amplitude-modulated signals;

FIG. 2 is a block diagram of a sampling and processing unit of the demodulator, designated UCE in FIG. 1;

SPECIFIC DESCRIPTION

Figure 3:
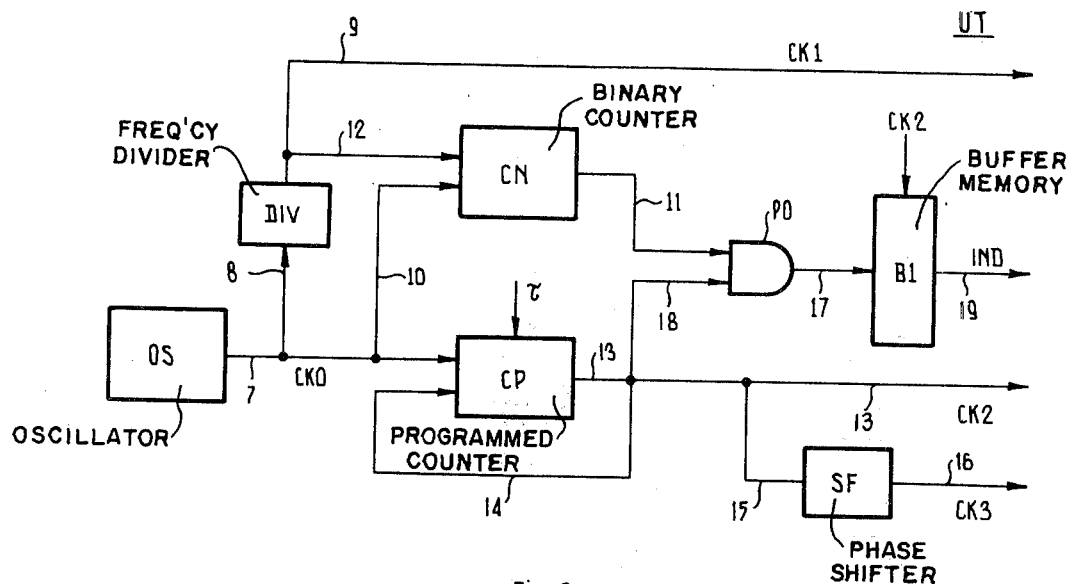
FIG. 3 is a block diagram of a timing unit, designated UT in FIG. 2.

In FIG. 1, reference UCE denotes a sampling and processing unit which, upon receiving a limited-bandwidth and linearly amplitude-modulated data signal $r(t)$, performs in-band sampling and digital conversion. Unit UCE respectively emits on connections 1 and 2, at the symbol rate and in suitable time slots, baseband samples X of the received signal and a linear conversion Y thereof appearing in quadrature with signal X.

To determine exactly the instants of recovery of the received signal and to adaptively regulate same, unit UCE receives from outside a digital signal $\tau$ representing the timing error.

The structure of unit UCE will be described in more detail in connection with FIG. 2.

Reference CJ depends a phase corrector, such as the one described in our commonly owned U.S. Pat. No. 4,048,572, designed to carry out the recovery of phase coherence on a baseband signal and to emit, on a connection 3, the signal demodulated in a coherent way.

Devices UCE and CJ form the demodulator according to the present invention, gradually designated DN.

Reference EQ denotes an equalizer possibly inserted downstream of unit CJ; reference SS denotes a synchronization estimator which, upon receiving the optionally equalized baseband signal, emits the error signal $\tau$; reference DC denotes a threshold discriminator which also receives the optionally equalized baseband signal coming from unit CJ and emits an evaluation of the transmitted message symbols; reference DO denotes a possible digital decoder which, when information symbols have undergone a line coding (e.g. a "partial response" coding), recovers the above-mentioned message symbols. Devices EQ, SS, DC, DO may be of any known type and do not form part of the present invention, which is why they will not be further described.

In FIG. 2, reference A/D denotes a conventional analog-to-digital converter, designed to carry out the in-band sampling and the digital conversion of the incoming signal $r(t)$ and to send, through a connection 4, digitized samples $r(t_k)$ to an interpolation unit UIN comprising devices TDL, FIN, ME which will be described hereinafter.

Circuit A/D is timed by a clock signal CK1 generated by a time base UT; it has a rate higher than the symbol rate of the received signal $r(t)$. According to our present invention, the frequency of clock pulses CK1 must be a multiple of the symbol rate according to a real, non-integral number, and more particularly according to a rational number $p/q$.

The choice of the values of $p$ and $q$ must be carried out so as to obtain the minimum sampling rate able to satisfy the requirements stated in the introductory part of the present description.

Reference TDL denotes a conventional tapped delay line that, on the basis of timing signal CK1, is able to receive digitized samples $r(t_k)$ generated by converter A/D and present on connection 4.

Reference FIN denotes an interpolator filter of transversal type which at instants determined by a timing signal CK2 also generated by unit UT, having a cadence equal to the symbol frequency of the modulated signal $r(t)$, receives through a connection 5 the samples contained in line TDL and processes them on the basis of suitable interpolating coefficients. Such coefficients are sent to filter FIN, through a connection 6, by a read-on memory ME, addressed by a signal IND and read at instants determined by timing signal CK2 and by a further timing signal CK3 which has the same rate as CK2 but is time shifted with respect to signal CK2.

More particularly, the processing operation carried out by filter FIN consists in implementing the following equations which we have devised:

$$X(t'_m) = \sum_{k=1}^{n} r(t_k) \cdot a_k(t'_m, t_k) \quad (1)$$

$$Y(t'_m) = \sum_{k=1}^{n} r(t_k) \cdot b_k(t'_m - t_k) \quad (2)$$

In these equations, whose theoretical derivation is not necessary for an understanding of our invention, parameter $t'_m$ is the generic instant of the recovery of the baseband signal, identified by a corresponding pulse CK2.

Parameter $t_k$ is the generic sampling instant of signal $r(t)$, identified by a corresponding pulse CK1.

The terms $a_k(t'_m - t_k)$, $b_k(t'_m - t_k)$ are processing coefficients expressed by the following equations:

$$a_k(t'_m - t_k) = h_c(t'_m - t_k)\cos\omega_c t_k + h_s(t'_m - t_k)\sin\omega_c t_k \quad (3)$$

$$b_k(t'_m - t_k) = -h_c(t'_m - t_k)\sin\omega_c t_k + h_s(t'_m - t_k)\cos\omega_c t_k \quad (4)$$

where $h_c(t'_m - t_k)$ and $h_s(t'_m - t_k)$ are the two components, in phase and in quadrature respectively, of an interpolation function and $\omega_c$ is the angular carrier frequency.

The value of variable $(t'_m - t_k)$ which appears in formulas (1), (2), (3), (4) is the addressing signal IND of memory ME. The structure of components FIN and ME will be described in greater detail with reference to FIG. 5.

The structure of timer UT will be described in greater detail with reference to FIG. 3.

Timing unit UT (FIG. 2) is piloted by error signal $\tau$, for the purposes already set forth with reference to FIG. 1.

In FIG. 3, reference OS denotes a conventional oscillator emitting on a connection 7 a basic clock signal CK0 of cadence $M \cdot f_s$, where $f_s$, as already mentioned, is the sampling rate and $M$ is an integer which, in order to make the construction easier, is of the form $2^r$.

Reference DIV denotes a conventional frequency divider of division factor $M$ which, upon receiving through connections 7 and 8 the basic clock signal CK0 generated by oscillator OS, emits on a connection 9 the signal CK1 of sampling rate $f_s$.

Reference CN denotes a conventional binary counter of capacity $r$, thus able to count from 0 to $M = 2^r$. Counter CN increments its contents by one unit whenever it receives a pulse from oscillator OS through connections 7, 10 and emits, on an output connection 11, a signal representing its reading. Every time it reaches its maximum capacity, counter CN is reset by the signal CK1 it receives from divider DIV through connections 9 and 12.

Reference CP denotes a programmed counter of conventional type, able to increment its contents by one unit whenever it receives from oscillator OS, through connection 7, a pulse of basic clock signal CK0. Counter CP sends out a pulse on a connection 13 every time its reading reaches a certain predetermined value; in the exemplary embodiment here described, in which the cadence of pulse train CK1 is related by a ratio $p/q$ to the cadence of pulse train CK2, the value preset in counter CP is $$M \frac{p}{q} + \tau.$$

Error signal $\tau$, derived from synchronization estimator SS of FIG. 1, is fed to a control input of counter CP, as shown.

The sequence of pulses outgoing from counter CP on connection 13 forms the timing signal CK2; this signal, sent back to an input of counter CP through a feedback connection 14, resets the counter to zero.

Reference SF denotes a conventional phase shifter receiving at its input, through connection 15, the clock signal CK2 and supplying at the output on connection 16 a signal CK3, having a rate equal to CK2 but phase shifted by half a cycle with respect thereto.

Figure 4:
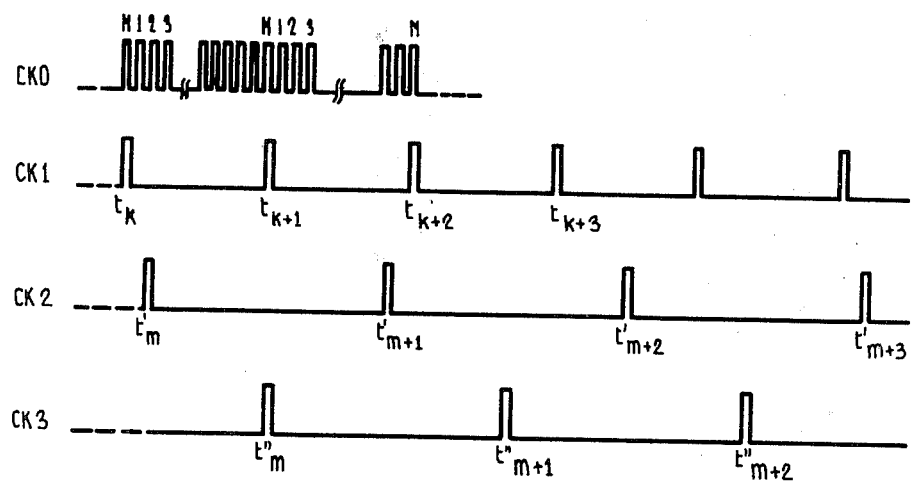
FIG. 4 is a set of graphs showing signals generated by the timing unit of FIG. 3.

The shape of the several clock signals CK0, CK1, CK2, CK3 is represented in FIG. 4. It will be noted that pulse trains CK2 and CK3 have a recurrence period or cycle length which is five-thirds that of pulse train CK1, hence $p/q = 5/3$.

Reference PO (FIG. 3) denotes a conventional logical AND gate receiving at one input, through connection 11, the contents of counter CN and transmitting this reading to a connection 17 in the presence of signal CK2 received on its other input from counter CP through connections 13 and 18.

Reference B1 denotes a conventional buffer memory receiving, through connection 17, gate PO and connection 11, the binary code representing the contents of counter CN and emitting this code on a connection 19, for a whole period of pulse train CK2, as the addressing signal IND for memory ME (FIG. 2).

The operation of the timing unit UT is as follows:

The basic clock signal CK0, generated by oscillator OS, is a sequence of pulses whose frequency is a multiple, by the factor $M$, of the desired sampling rate $f_s$; signal CK0 is sent through connection 7 to programmed counter CP and, through connections 8 and 10, to divider DIV and counter CN, respectively.

Counter CP cyclically counts from 0 to the preset value $$M \frac{p}{q} + \tau$$

the pulses CK0 and, every time it reaches this preset value (instants $t'_m, t'_{m+1} \ldots$, FIGS. 4), sends out a pulse CK2 on connection 13 (FIG. 3); the pulse train CK2 present on this connection, therefore, has a cadence $$\frac{q}{p} \cdot f_s$$

equaling the symbol frequency of the received signal $r(t)$. This signal CK2 is supplied, through a connection 15, to a phase shifter SF emitting, on an output connection 16, a pulse train of like cadence constituting the timing signal CK3.

The instants of emission of pulses CK2 are adjusted by error signal $\tau$, generated by synchronization estimator SS (FIG. 1) on the basis of the previous samples, to facilitate in unit UIN (FIG. 2) the reconstruction of the baseband signal at the most advantageous instants.

Divider DIV (FIG. 3), stepping down the frequency of signal CK0 by the factor M, generates a pulse on output lines 9, 12 whenever at its input, connected to line 8, M pulses CK0 have appeared (instants $t_k$, $t_{k+1}$, $t_{k+2}$..., FIG. 4); the pulses CK1 on connections 9, 12 thus have the cadence $f_s$.

Pulse train CK1 present on connection 12 resets counter CN at the instants $t_k$, $t_{k+1}$... (FIG. 4); counter CN cylically counts the pulses CK0 from 0 to its maximum reading M, and the binary code present at any instant on its output connection 11 clears the gate PO at instants $t'_m$, $t'_{m+1}$... when that gate is unblocked by the pulses CK2 issuing from counter CP. This binary code, accordingly, represents the number of pulses CK0 counted by device CN between instant $t_k(t_{k+1}, t_{k+2}...$, FIG. 4.) and the subsequent instant $t'_m$ (or, respectively, $t'_{m+1}$, $t'_{m+2}$...), thereby measuring the delay of a pulse CK2 with respect to the immediately preceding pulse CK1.

The resulting signal IND, serving to address the memory ME (FIG. 2), is then sent to buffer memory B1 which makes it available on its output 19 for an entire cycle of pulses CK2.

Figure 5:
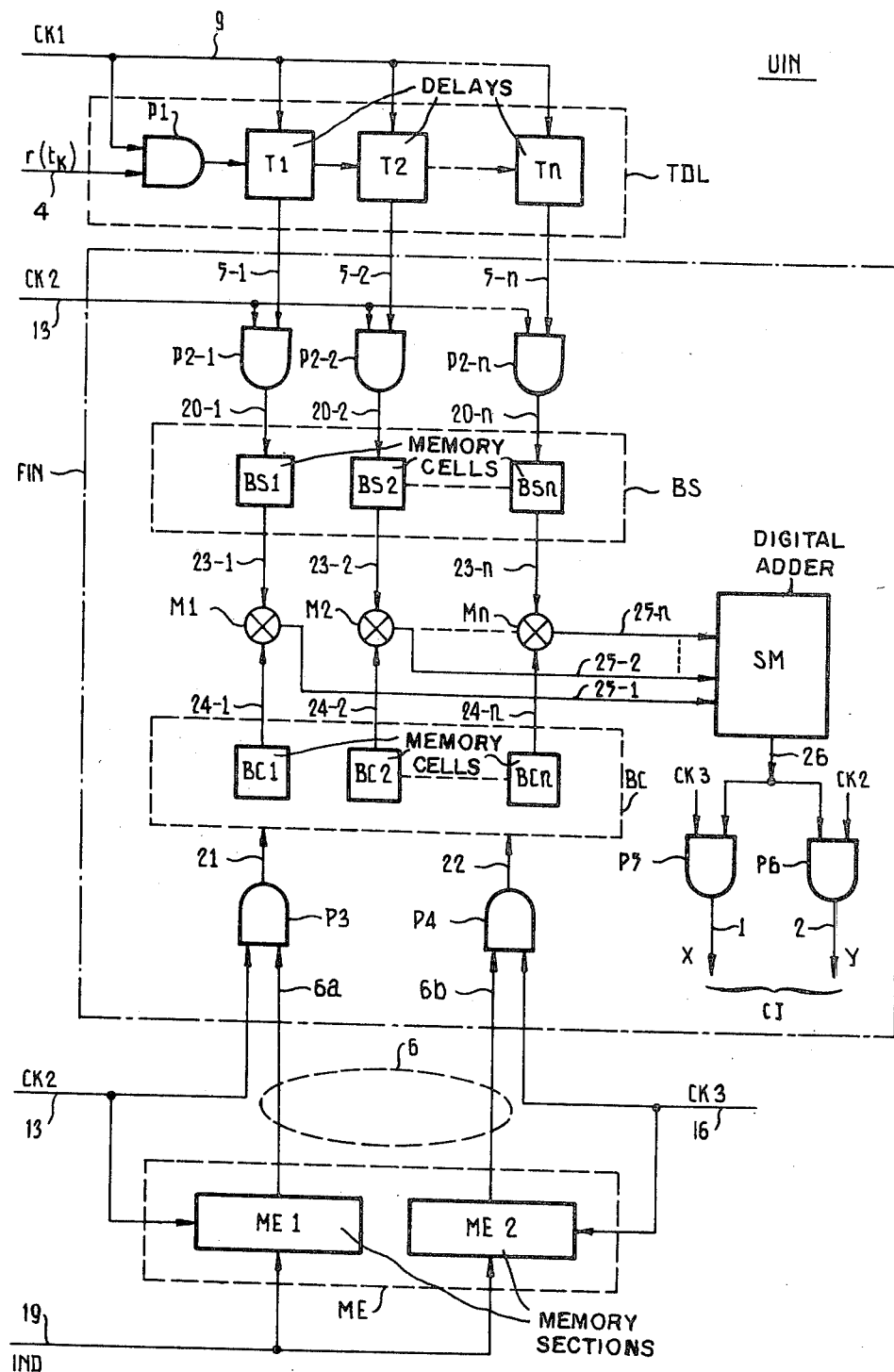
FIG. 5 is a more detailed circuit diagram of an interpolation unit designated UIN in FIG. 2.

In FIG. 5, reference P1 denotes a conventional logical AND gate which passes the sample $r(t_k)$, present on connection 4, in the presence of every pulse CK1.

Reference T1, T2 ... Tn denote a plurality of cascaded cells constituting delay line TDL. Each of these cells is able to contain a sample $r(t_k)$ of the received signal; they are loaded at the timing rate determined by signal CK1 which is sent to them and to gate P1 through connection 9.

Filter FIN includes a further set of logical AND gates P2-1, P2-2 ... P2-n which are periodically unblocked by pulses CK2 on lead 13 to transmit, through connections 20-1, 20-2 ... 20-n, the contents of cells T1, T2 ... Tn present on their input connections 5-1, 5-2 ... 5-n, respectively.

Reference BS denotes a conventional buffer memory, also forming part of filter FIN and consisting of n cells BS1, BS2 ... BSn, which stores the contents of the correspondingly designated cells of delay line TDL communicating with them through connections 20-1, 20-2 ... 20-n.

Reference BC denotes a further buffer memory, also included in filter FIN and consisting of n cells BC1, BC2 ... BCn, each designed to store one of the coefficients $a_k$, $b_k$ of equations (1)–(4) serving to process samples $r(t_k)$, these coefficients remaining available on their outputs 24-1, 24-2 ... 24-n for half a period of signal CK2 or CK3.

References ME1, ME2 denote two read-only memory sections, respectively designed to store the values of coefficients $a_k$ and $b_k$, together forming the memory ME (FIG. 2).

The realization of these memory sections, able to hold the values specified in equations (3) and (4), can be handled by any person skilled in the art so that their structure need not be further described.

Memory sections ME1, ME2 are both addressed by signal IND, and are read under the control of signal CK2 or signal CK3, respectively.

Reference P3 denotes another logical AND gate which, under the control of timing signal CK2, transmits to buffer memory BC, through a connection 21, the coefficients received over a connection 6a from memory section ME1.

Reference P4 denotes a similar AND gate which, under the control of timing signal CK3, transmits to buffer memory BC, through a connection 22, the coefficients received over a connection 6b from memory section ME2.

References M1, M2 ... Mn denote digital multipliers of conventional type, each able to multiply the value of the sample loaded in the correspondingly designated cell of buffer memory BS by the coefficients $a_k$ or $b_k$ present in the associated cell of memory BC.

These samples and coefficients are sent to multipliers M1, M2 ... Mn through connections 23-1, 23-2 ... 23-n and 24-1, 24-2 ... 24-n, respectively.

Reference SM denotes a conventional digital adder able to receive through connections 25-1, 25-2 ... 25-n the products of the operations performed by multipliers M1, M2 ... Mn, respectively, and to emit on an output connection 26 the algebraic sum of those products.

References P5, P6 denote two further AND gates serving to transmit the output signal of adder SM over connections 1, 2 as samples X and Y, respectively. Gates P5 and P6 are respectively unblocked by timing pulses CK3 and CK2.

Since the signals, samples or coefficients passing through gates P0, P1 and the cells of components TDL, BS, BC are digital, and are therefore each expressed by a plurality of bits, these gates and cells will in pratice each consist of a plurality of similar devices, each allotted to one of the bits forming the signal to be processed.

The operation of the demodulator according to our invention will now be described with reference to the drawing.

The in-band signal $r(t)$ received by converter A/D (FIG. 2) is sampled and transformed to digital form at the rate imposed by timing signal CK1.

At the output 4 of converter A/D, at the sampling instants $t_k$, digitized samples $r(t_k)$ will be present which, always at the rate determined by signal CK1, are serially loaded into cells T1, T2 ... Tn (FIG. 5) of delay line TDL.

Hereinafter, it will be assumed that from the beginning of the operation of the receiver, equipped with our improved demodulator DN (FIG. 1), at least n pulses of signal CK1 have arrived at circuits A/D and TDL (FIG. 2), i.e. that at least n samples have already been generated. Each of the cells of line TDL is therefore occupied by a signal sample, and the processing carried out by unit UIN really concerns n samples $r(t_k)$, thus giving rise to reliable results for the recovery of the baseband signal.

We shall therefore describe the operation of the receiver with reference to its steady-state condition, neglecting the initial transitory phase of operation.

Let time $t_k$ (FIG. 4) be the instant of arrival of the first pulse CK1. At the instant $t'_m$ of arrival of the pulse CK2 immediately following this first pulse CK1, the $n$ samples present in cells T1, T2 ... T$n$ (FIG. 5) of line TDL are transferred in parallel to respective cells BS1, BS2 ... BS$n$ of buffer memory BS, through connections 5-1, 5-2 ... 5-$n$, gates P2-1, P2-2 ... P2-$n$ and connections 20-1, 20-2 ... 20-$n$.

With the arrival of the same pulse CK2 (FIG. 4) the $n$ coefficients $a_k$ necessary for the implementation of equation (1) are read out from memory section ME1 (FIG. 5) at the address $t'_m - t_k$, and gate P3 is opened to allow the transfer of these coefficients into cells BC1, BC2 ... BC$n$ of memory BC.

At this time there appear on connections 23-1, 23-2 ... 23-$n$ and 24-1, 24-2 ... 24-$n$ the values of $n$ successive samples of signal $r(t)$ and the $n$ coefficients $a_k$ necessary to carry out interpolation filtering according to equation (1).

In the time interval lying between the instant $t'_m$ (FIG. 4) of arrival of the considered pulse CK2 and the instant $t''_m$ of arrival of the immediately following pulse CK3, each of the multipliers M1, M2 ... M$n$ (FIG. 5) calculates the product of the value of a respective sample times the corresponding coefficient $a_k$; these products are sent through connections 25-1, 25-2 ... 25-$n$ to adder SM which thereupon generates the algebraic sum of the outputs of all these multipliers, i.e. the sample X of the demodulated signal.

At instant $t''_m$ a pulse CK3 arrives to unblock the gate P5 and thus to let the sample X pass via connection 1 to the downstream devices of the receiver, in particular to phase corrector CJ (FIG. 1).

This pulse CK3 enables at the same time the readout from memory section ME2 (FIG. 5), at the address specified by the same signal IND as with memory section ME1, of coefficients $b_k$ necessary for the filtering represented by equation (2), as well as the unblocking of gate P4 for transferring the latter coefficients to the corresponding cells of memory BC. In the time interval between instants $t''_m$ and $t'_{m+1}$, i.e. between the arrival of the first pulse CK3 and the arrival of the subsequent pulse CK2, circuits M1, M2 ... M$n$ multiply the samples written into memory BS by coefficients $b_k$ whereby sample Y will appear at the output of adder SM.

The next pulse CK2, which arrives at instant $t'_{m+1}$, unblocks the gate P6 and thus enables transmission over connection 2 of sample Y to the down-circuit devices of the receiver, in particular to phase corrector CJ (FIG. 1).

At the same time the pulse CK2 (FIG. 2) initiates a new processing cycle of filter FIN, with the new samples present in line TDL beginning from instant $t_{k+1}$ (FIG. 4), and with coefficients read out of memory sections ME1, ME2 (FIG. 5) at address $t'_{m+1} - t_{k+1}$.

At every cycle of pulse train CK2 a sample X and a sample Y will be present at the output of filter FIN and will be utilized by phase corrector Cj (FIG. 1) to make the demodulation carried out in demodulator UCE coherent, whereupon these samples will undergo possible further processing in units EQ, DC, DO, to reproduce the actual message signal.

The generation of samples X, Y with their exact timing exclusively by signal CK2, without modifying the sampling signal CK1, allows the subsequent extraction in phase corrector CJ (FIG. 1) of the information concerning the demodulation phase. In fact, as known to persons skilled in the art, if the adjustment of the instant of recovery of the demodulated signal is carried out with a shifting of the clock signal CK1 which determines the sampling instant, a variable parameter depending on the shifts of pulses CK1 is introduced in the demodulation phase which obviously makes it difficult to obtain the information relating to that phase.

It is evident that the demodulator according to our invention can be utilized with any system utilizing amplitude modulation, as long as the particular type of modulation used is taken into account, by simply adapting the interpolation coefficients $a_k$, $b_k$ to its mode of operation.

We claim:

1. A digital demodulator of data signals of a given symbol frequency transmitted by linear amplitude modulation of a carrier, comprising:

a source of first, second and third clock pulses, said first clock pulses having a cadence higher than said symbol frequency but not harmonically related thereto, said second and third clock pulses having a cadence equal to said symbol frequency while being relatively staggered by half a cycle of their cadence;

analog/digital conversion means connected to said source for deriving a series of digitized samples from an incoming modulated carrier at the cadence of said first clock pulses;

delay means connected to said conversion means and controlled by said first clock pulses for simultaneously presenting a multiplicity of successively received digitized samples on respective outputs thereof;

first and second memory means respectively storing first and second sets of interpolation coefficients which are functions of the carrier frequency, said first and second memory means having enabling inputs connected to said source for respectively receiving said second and third clock pulses therefrom;

a generator of address signals controlled by said first and second clock pulses, said generator being connected to said first and second memory means for reading out a multiplicity of first interpolation coefficients from said first memory means in the presence of a second clock pulse and for reading out a multiplicity of second interpolation coefficients from said second memory means in the presence of a third clock pulse;

digital filter means with first and second inputs respectively connected to said first and second memory means and with other inputs connected to the outputs of said delay means for deriving from said digitized samples and from said first and second interpolation coefficients two interleaved trains of in-phase samples and quadrature samples;

phase-correcting means connected to said digital filter means for recovering a phase-coherent baseband signal from said in-phase and quadrature samples; and synchronization-estimating means downstream of said phase-correcting means feeding back an error signal to said source for establishing an optimum relative time position of said first, second and third clock pulses.

2. A demodulator as defined in claim 1 wherein said source comprises an oscillator emitting a train of basic clock pulses at a cadence which is a multiple of the cadence of said first clock pulses and a different multiple of the cadence of said second and third clock pulses, frequency-dividing means connected to said oscillator for generating said first clock pulses, a programmed pulse counter connected to said oscillator in parallel with said frequency-dividing means for emitting a second clock pulse and resetting itself upon reaching a preset count modifiable by said error signal, and phase-shifting means connected to said programmed pulse counter for deriving said third clock pulses from the second clock pulses emitted by the latter.

3. A demodulator as defined in claim 2 wherein said generator comprises a further pulse counter connected to said oscillator for stepping by said basic clock pulses and to said frequency-dividing means for resetting by said first clock pulses, and gating means connected to said pulse counters for reading out the contents of said further pulse counter in the presence of a second clock pulse emitted by said programmed pulse counter.

4. A demodulator as defined in claim 1 wherein said digital filter means comprises a set of first memory cells connected to said first and second inputs, a set of second memory cells connected to said other inputs, first and second logic gates respectively inserted in said first and second inputs for loading said first memory cells with said first interpolation coefficients in the presence of said second clock pulses and with said second interpolation coefficients in the presence of said third clock pulses, further logic gates inserted in said other inputs for loading said second memory cells with said digitized samples in the presence of said second clock pulses, a set of digital multipliers connected to said first and second memory cells for producing the products of the interpolation coefficients and digitized samples respectively stored therein, and digital adding means for summing the products formed with said first interpolation coefficients to produce said in-phase samples and for summing the products formed with said second interpolation coefficients to produce said quadrature samples.

5. A demodulator as defined in claim 4 wherein said digital adding means is provided with a pair of parallel AND gates, one of said AND gates having an enabling input receiving said third clock pulses for passing said in-phase samples in their presence, the other of said AND gates having an enabling input receiving said second clock pulses for passing said quadrature samples in their presence.

* * * * *